United States Patent Office 3,302,389
Patented Feb. 7, 1967

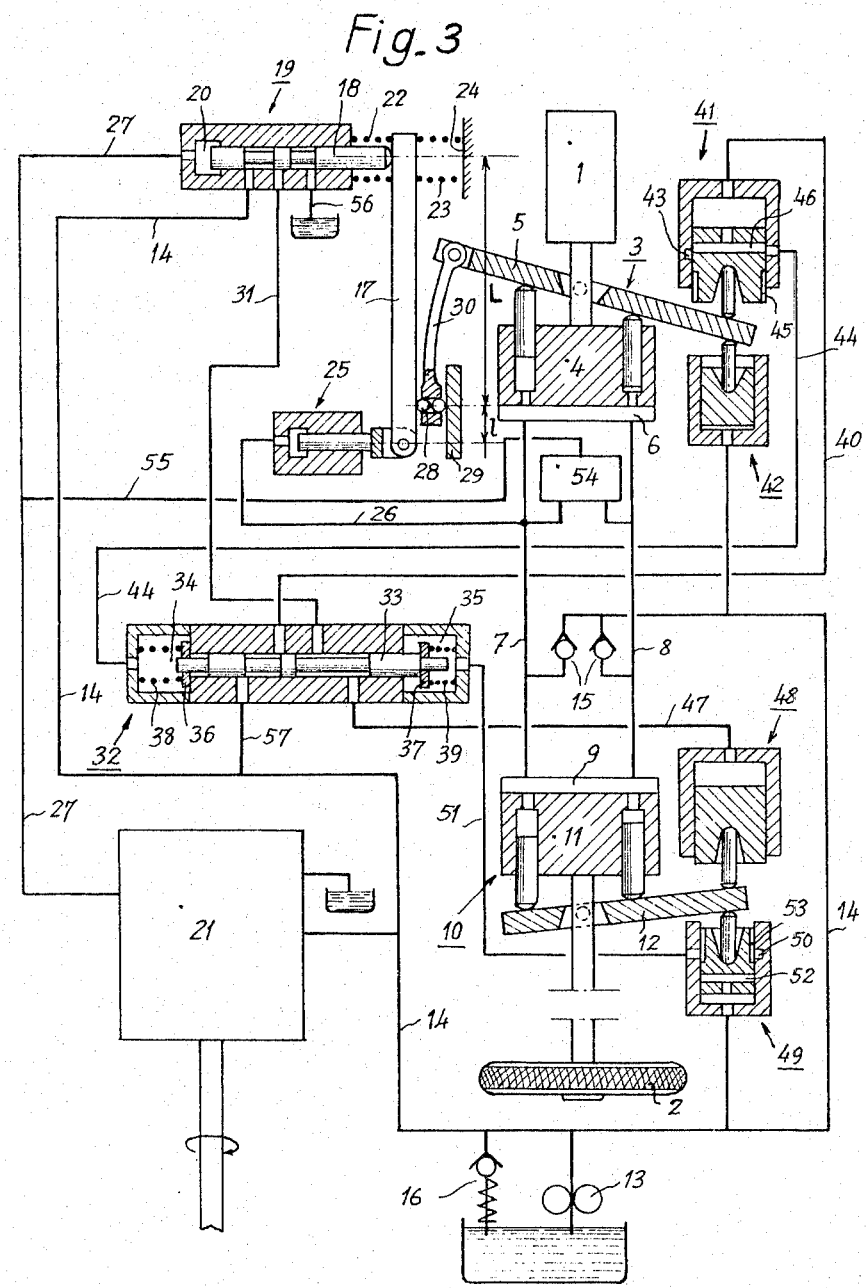

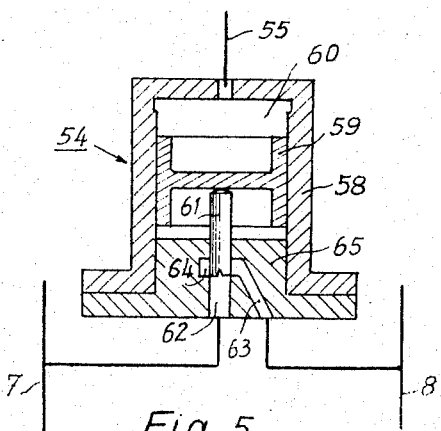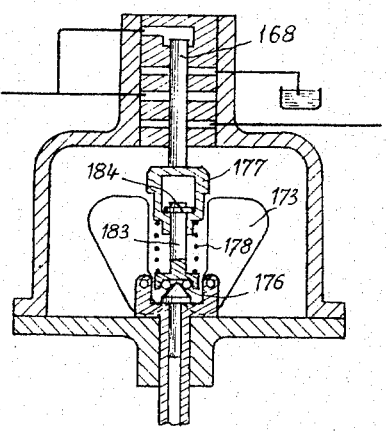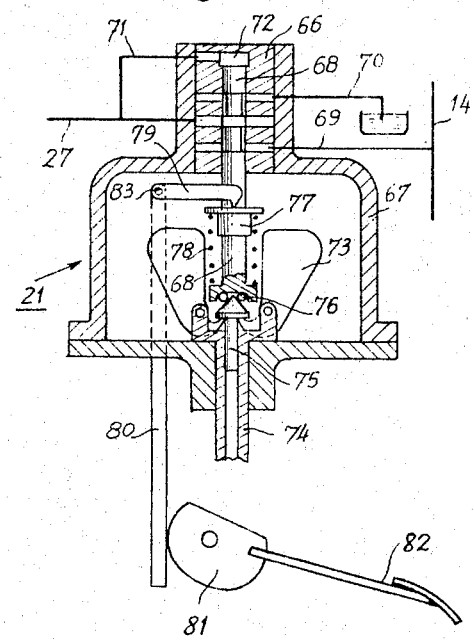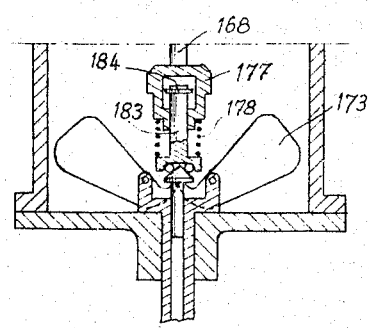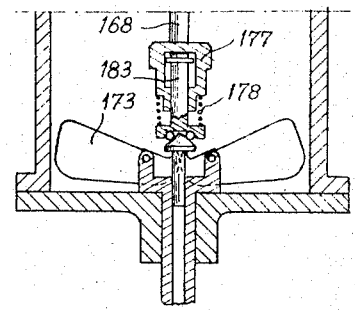

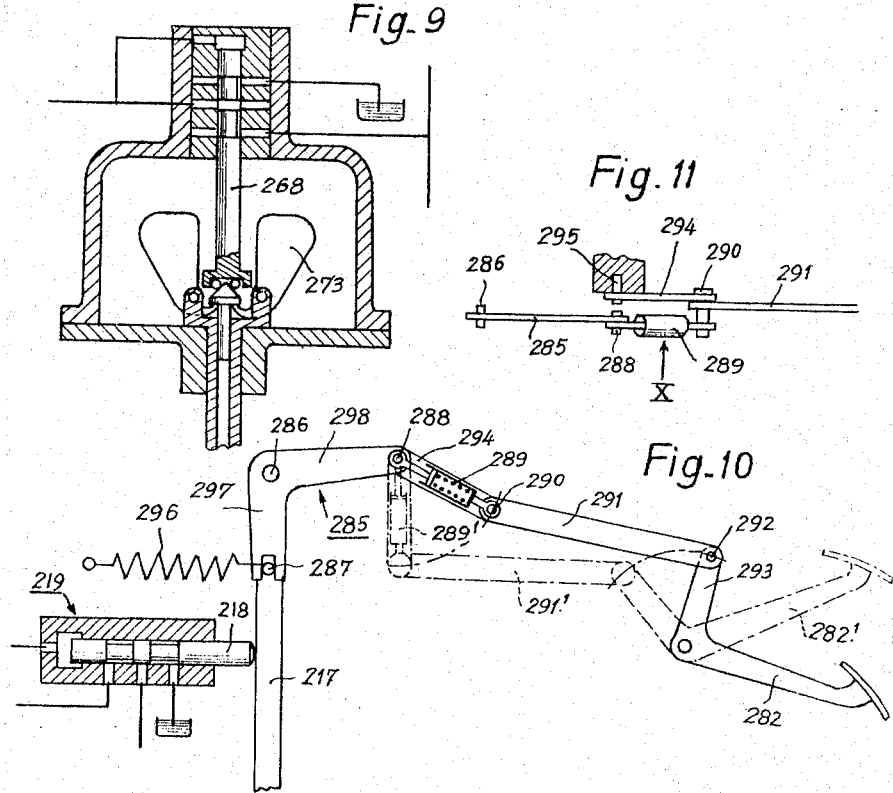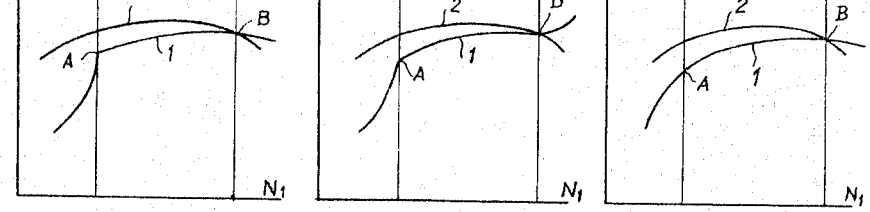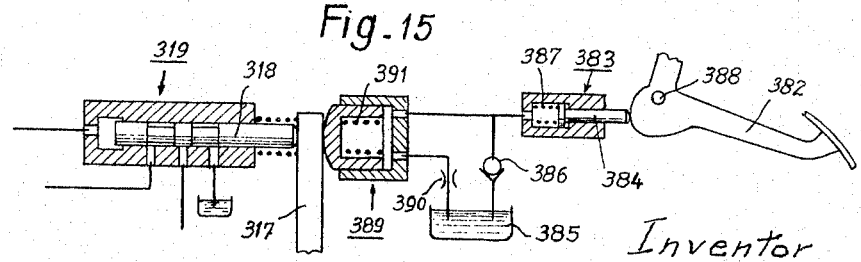

3,302,389
REGULATING DEVICES OF BARREL-TYPE
HYDRAULIC TRANSMISSION SYSTEMS
Jean Cadiou, Paris, France, assignor to Societe Anonyme
Andre Citroen, Paris, France, a French corporation
Filed July 19, 1965, Ser. No. 472,991
Claims priority, appplication France, July 28, 1964,
983,306, Patent 1,416,391
7 Claims. (Cl. 60—19)

Barrel-type hydraulic transmission systems are frequently utilized in conjunction with a regulating device adapted to maintain to a constant value the input torque for a given power output, the reaction torque being variable.

This applies notably to the utilization of these transmission systems to the propulsion of automotive vehicles.

This transmission comprises essentially two hydraulic members or assemblies, namely, a generator connected to the power unit of the vehicle and at least one generator drivingly connected to the wheels.

In order to avoid redundancies in the following disclosure, only two members will be mentioned: one generator and one receiver. Each one of these members is of the type comprising a rotary barrel engaging an inclined plate called "impeller plate," of which the angle of inclination is substantially proportional to the cubic capacity of said member, i.e. to the volume of liquid drawn by it during one revolution. The adjustment of the inclination of the impeller plate constitutes on the other hand the only means permitting of modifying the cubic capacity of the member concerned.

These two members are hydraulically interconnected through a pipe line transmitting the liquid at the working pressure or "high pressure," and through a low-pressure return pipe line in which the minimum pressure value is obtained by means of a pump.

In the case of high reduction ratios, corresponding to the starting or low road speeds of the vehicle, the cubic capacity of the receiver may be kept at its maximum value and the cubic capacity of the generator may be caused to vary as an inverse function of the working pressure, so as to keep the input torque of the generator at a constant value. This is the so-called "variable pressure" first phase of the operation.

In the case of lower reduction raitos, it is the cubic capacity of the generator that is set at its maximum value, the cubic capacity of the receiver being so adjusted as to keep the working pressure and therefore the generator torque at a constant value.

This is the so-called "constant pressure" second phase of the operation.

Moreover, means are provided for acting upon the cubic-capacity adjustment members as a function of the power output demanded to the vehicle engine.

Various forms of embodiment of a hydraulic transmission of the general character set forth hereinabove are known at present, of which the adjustment is consistent with the phases described in the foregoing.

This applies notably to the device described and illustrated in the U.S.A. patent application No. 355,310 of March 27, 1964, now Patent 3,213,618, issued October 26, 1965.

In this prior patent the adjustment of the transmission according to the first phase set forth hereinabove is obtained by means of a fluid-tight deformable enclosure filled with a gaseous mass of which the volume is rendered proportional to the cubic capacity of the generator, and of which the pressure is compared, except for one factor, to the working pressure of the transmission by utilizing the slide valve of a distributor controlling through hydraulic cylinders the adjustment of the impeller plate of the generator.

In the same apparatus, changing from the first phase to the second phase is reversibly obtained by providing a mechanical coupling between the two impeller plates, this coupling acting upon a second distributor locking the generator plate in its maximum inclined position and actuating likewise through hydraulic cylinders the receiver plate in order to keep the working pressure at a constant value.

It is the object of the present invention to provide improvements in regulating devices of this character, which consist in obtaining the above-described two successive phases by using considerably stronger and more advantageous means, the main component of these means being a compensator beam.

This compensator beam receives at its ends, and normally to its length, thrusts having all the same direction and which are respectively proportional to a predetermined function of the velocity of translation of the vehicle and to the working pressure of the transmission, the resultant of these thrusts being counterbalanced by the oppositely directed thrust exerted by a movable bearing member connected to the impeller plate of the generator.

The thrust proportional to the engine speed is developed by a tachometric regulator and expander fed from the low-pressure side of the pump and delivering in a manner known per se a hydraulic fluid at an expanded pressure which is a predetermined function of speed.

This expanded pressure is applied, in an end chamber of a cylinder-type distributor, to one face of the slide valve of this member, the other face engaging said compensator beam. The distributor incorporated in this member controls, by means of an apportioner, a series of hydraulic cylinders adapted to modify the angular setting of the impeller plates of the generator and receiver, according to the two successive phases set forth hereinabove.

In order to afford a clearer understanding of this invention, a general form of embodiment thereof will now be described by way of example, this construction being applicable more particularly to the transmission system of a vehicle. In the drawings:

FIGURES 1, 2, and 3 are diagrammatic views showing the device of this invention respectively in three different phases of its operation;

FIGURE 4 is a section showing a clutch control member;

FIGURE 5 is a section showing a first form of embodiment of the tachometric regulator-expander;

FIGURES 6, 7 and 8 are sections showing another form of embodiment of this regulator-expander respectively during three successive phases of its operation;

FIGURES 9, 10 and 11 illustrate a third form of embodiment of the same member associated with an external compensator system;

FIGURES 12, 13 and 14 are diagrams showing the mode of operation respectively of the preceding three forms of embodiment of the tachometric regulator expander; and FIGURE 15 is a diagrammatic section showing a device for temporarily increasing the ratio of reduction gear in case of sudden depression of the accelerator pedal.

Figure 1:
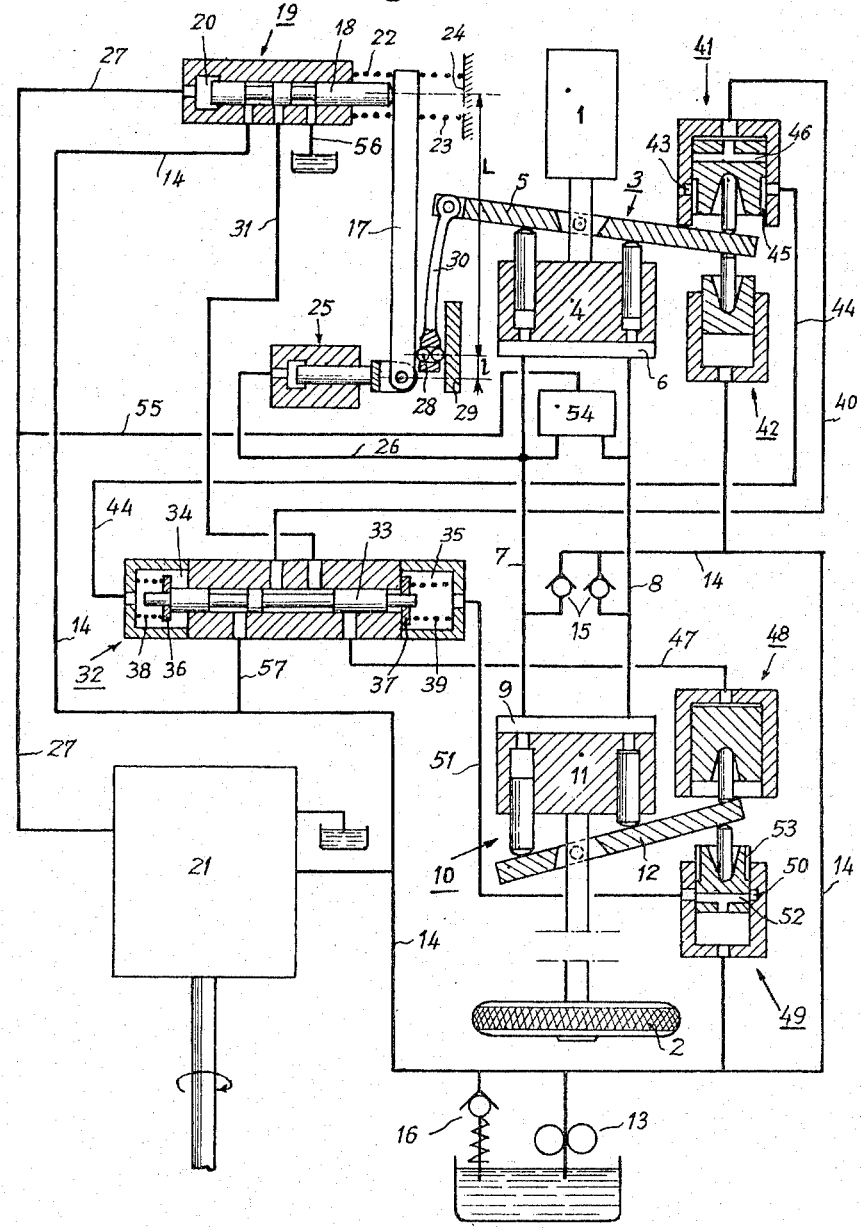

The transmission illustrated in FIGURE 1 is disposed between the engine 1 or power unit of the vehicle and the road wheels shown in diagrammatic form at 2.

It comprises a generator 3 having a barrel 4 rotatably driven between an impeller plate 5 and a fixed face 6 connected through pipe lines 7 and 8 to the fixed face 9 of a receiver 10 having its barrel 11 rotatably mounted between an impeller plate 12 and said face 9.

The pipe line 7 delivers the hydraulic fluid at a high or working pressure.

The pipe line 8 is provided for returning the oil at a minimum pressure provided for by the pump 13 through another pipe line 14 and a pair of non-return valves 15 (this double valve arrangement being necessary to comply with reversing requirements, as will be readily understood). A gaged valve 16 limits the pressure in pipe line 14 to a predetermined value.

The regulation of this transmission is obtained by using a compensator beam 17 receiving at one end, through the slide valve rod 18 of a distributor cylinder 19, a thrust equal to the pressure exerted thereagainst in the chamber 20 of member 19 by a liquid pressure proportional to the velocity of rotation of the vehicle engine, this pressure being produced by a member 21 to be described presently, which is connected through a pipe line 27 to said member 19.

Spring means 22 and 23 associated with a reaction stop 24 control the thrust exerted by the rod 18 of said slide valve on the beam 17. The opposite end of this beam is responsive to a hydraulic cylinder 25 applying thereto a thrust of same direction as that of slide-valve rod 18 and proportional to the high pressure prevailing in the transmission, which is applied through a pipe line 26.

These two thrust have their resultant counter-balanced by means of a movable abutment in the form of a pair of adjacent rollers 28 in rolling engagement the one with the beam 17 and the other with a fixed abutment 29 in a cage solid with an arm 30 pivoted to the impeller plate 5 of the generator, as shown in the drawings.

The distributor of member 19, is connected not only to the feed pump and exhaust sump through pipe lines 14 and 56 respectively, but also to a member 32 acting as a distributor-apportioner by means of a pipe line 31.

This distributor-apportioner 32 is connected through a pipe line 40 to a hydraulic cylinder 41 controlling the increment in the inclination of plate 5 in opposition to a counter-cylinder or return-cylinder 42 connected to the low-pressure line 14.

The inner surface of cylinder 41 has a circular groove 43 formed therein which is connected through a pipe line 44 to the chamber 34 of member 32, this line 44 being adapted to be either vented to the atmosphere through the longitudinal grooves 45 formed in the piston sliding in said cylinder (when the piston is in the position shown in the figure), or connected to the pipe line 40 through ducts 46 formed in said piston and communicating with the inner chamber or bottom of the cylinder.

The member 32 is also connected by means of a pipe line 47 to a hydraulic cylinder 48 serving the purpose of reducing the inclination of the impeller plate of the receiver in opposition to the return force of a counter-cylinder 49 connected to the pump line 14.

The inner wall of cylinder 49 has an annular groove 50 (similar to the annular groove 43 of cylinder 41) formed therein which is connected to the chamber 35 of member 32 through a pipe line 51 and adapted to communicate either with the chamber of said cylinder through ducts 52 formed in its piston (when the latter is in the position shown in the figure) or with the outside through longitudinal grooves 53 formed in said piston, but in the lower position thereof.

The distributor-apportioner 32 is also connected through a pipe line 57 to the pump pressure line 14.

The member designated by the reference numeral 54 is a valve responsive to the pressure prevailing in the pipe line 27 (transmitted through another pipe line 55) for the purpose of interconnecting the pipe lines 7 and 8 of the transmission or, in other words, disconnecting this transmission from the drive wheels when the engine speed has dropped below a predetermined value.

A specific form of embodiment of this valve will be described presently with reference to the FIGURE 4.

Figure 2:
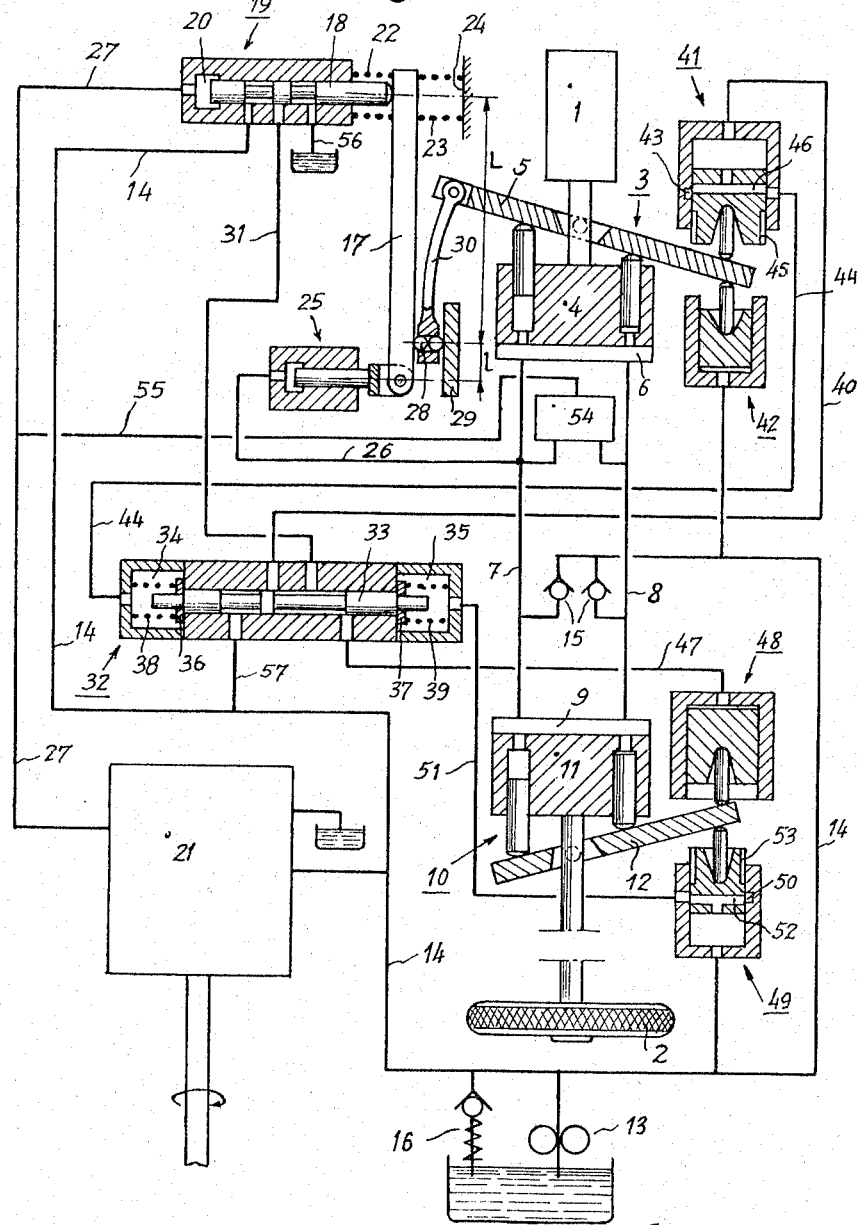

Reverting to the general diagram of FIGURE 1, a detailed description of the mode of operation of this device will now be given with reference also to FIGURES 2 and 3 showing different operative positions of the same device.

FIGURE 1 shows the mode of operation of the transmission according to the first phase as defined hereinabove, providing high reduction ratios (such as required for starting the vehicle from rest and driving at low road speeds), whereat the cubic capacity of the generator varies as an inverse ratio of the working pressure, the cubic capacity of the receiver remaining locked at its maximum value.

It will be assumed that FIGURE 1 illustrates the device in a condition of equilibrium defined as follows:

In this condition, the movable abutment 28 engages a point so located along the beam 17 as to compensate or balance the thrusts of cylinders 19 and 25, these thrusts being respectively proportional to a function of the engine velocity and also to the working pressure of the transmission. As the impeller plate 5 is not in its position of maximum inclination, the annular groove 43 of cylinder 41 registers with the grooves 45, whereby the chamber 34 of apportioner 32 is vented to the atmosphere.

On the other hand, the pressure obtaining in the opposite chamber 35 of apportioner 32 is that pressure delivered by the pump through the groove 50 and ducts 52 of cylinder 49.

The slide valve 33 of apportioner 32 is thus shifted towards the chamber 34 as shown in FIGURE 1. Slide valve 18 of member 19 is in its neutral position, thus isolating the line 31 from both lines 14 and 56.

Under these conditions, if the resistant torque impressed on the receiver 10 were increased the working pressure would increase, as well as the thrust exerted by the cylinder 25 on the compensator beam 17, whereby the slide valve 18 of distributor 19 would be depressed.

As clearly shown in the figure, this will cause pipe lines 31 and 56 to communicate with each other, thus connecting the cylinder 41 through lines 56, 31 and 40 to the exhaust. As a consequence, the piston in cylinder 42 is raised (the term "raised" being used herein in relation to the position of this cylinder in the figure) and reduces the inclination of impeller plate 5, the movable abutment 28 being simultaneously lowered until the compensator beam 17 resumes its position of equilibrium and the communication 31–56 is cut off by the slide valve 18 having resumed its neutral position.

The impeller plate 5 is retained in this new position defined by the lengths $l$ and $L$ of the lever arms of beam 17.

If on the other hand the resistant torque decreases (or if the pressure delivered by the member 20 increases as a consequence of a higher engine speed) the slide valve 18 is shifted to the right as seen in the figure and the slide valve 41 is supplied with fluid at the delivery pressure of pump 13 through the pipe lines 14, 31 and 40.

As the cross-sectional area of the piston in cylinder 41 is greater than that of the piston in cylinder 42, the former is preponderant and the inclination of impeller plate 5 is increased until the increment in lever arm $l$ causes the compensator beam 17 and slide valve 18 to resume their respective positions of equilibrium, thus discontinuing immediately the delivery of low-pressure fluid to cylinder 41.

The input torque is kept at a constant value for the following reasons. Assuming that $p$ is the working pressure of the transmission, $P$ the fluid pressure delivered by member 21 (as a function of the engine speed), the condition of equilibrium of compensator beam 17 is given by the equality:

$$kpl = k'PL$$

wherein $k$ and $k'$ are constant proportionality factors.

The arrangement may be such that $l$ be very substantially proportional to the angle of inclination of impeller plate 5, that is, to the cubic capacity $V1$ of the generator. Since, on the other hand, the major variations of $l$ may remain proportionally small in comparison with L, provided that the $k$ and $k'$ factors are properly selected, L may be regarded as practically constant, and the preceding equation may be written:

$$pV1 = K$$

wherein K is a global constant.

In this form the equation expresses the constance, for a given power output, of the product of the working pressure of the transmission by the cubic capacity of the generator, in conformity with the requirement concerning the constance of the input torque of this transmission according to the first phase of operation under variable pressure conditions.

Moreover, it may be noted that since the input torque is proportional to PL it is also proportional to P (and, therefore, to the thrust exerted by the slide valve 18). This remark will be applied in a later part of this description.

If the input torque continues to decrease (or if the engine speed keeps increasing) the inclination of plate 5 will increase gradually until it attains its maximum value as shown in FIGURE 2.

When this position is reached the piston of cylinder 41 cuts off the communication between the annular groove 43 and longitudinal grooves 45, thus connecting this annular groove 43 with the interior of this cylinder through ducts 46. As a consequence, the chamber 34 of apportioner 32 is no more connected to the atmosphere but communicates with the pump through pipe lines 14, 31, 40, 46, 44 and 34.

Then, slide valve 33 is urged by its spring 38 to the intermediate position as shown in FIGURE 2.

In this intermediate position, if the drop in resistant torque ceases for a constant engine power output, the beam 17 resumes its neutral position as well as slide valve 18, and the transmission ratio remains unchanged.

If in the same position the resistant torque begins to rise the slide valve 18 will be shifted to the left as seen in the drawing and the cylinder 1 will be discharged through pipe lines 56, 31 and 40, whereby its piston will rise and reduce the inclination of plate 5, chamber 34 of device 32 being again vented to the atmosphere.

The device is thus brought back to the conditions prevailing in FIGURE 1, which correspond to the first phase.

On the other hand, if the resistant torque continues to decrease (the device remaining in the intermediate condition shown in FIGURE 2) the slide valve of member 19 is (or remains) shifted to the right. The slide valve 33 of apportioner 32 being in its intermediate position shown in FIGURE 2, the cylinder 48 will be fed with fluid under the pressure provided by the pump through the lines 14, 31 and 47. As the piston of this cylinder 48 has a greater cross sectional area than that of the return cylinder 49, the former becomes preponderant and moves downwards, thus decerasing the inclination of plate 12 of receiver 10 while connecting the chamber 35 of member 32 to the exhaust through pipe lines 35, 51, 50 and 53, whereby the slide valve 33 is shifted to the right-hand side of the device as seen in FIGURE 3.

This figure also shows that the impeller plate 5 of the generator is now locked in its maximum inclined position by the cylinder 41 constantly fed with pressure fluid from the pump through pipe lines 14, 57 and 40, and its inclination is altered by the other plate 12 as a consequence of variations in the resistant torque.

The mode of regulation applied to this end may be explained as follows:

As the movable counter abutment 28 of compensator beam 17 has now become stationary, a constant engine power output will determine through members 21 and 19 a constant thrust of slide valve 18 which can only be compensated or counterbalanced by a constant thrust exerted by the cylinder 25, which implies a similarly constant working pressure $p$.

If in this state of balance the resistant torque begins to decrease, the pressure $p$ will also decrease and the slide valve 18 will be shifted to the right, as seen in the drawings, and cylinder 48 will receive fluid at the pump pressure through lines 14, 31 and 47, thus reducing the inclination of plate 12 and therefore the cubic capacity V2 of the receiver.

However, since the receiver torque (which counterbalances the predetermined resistant torque) is proportional to the product $pV2$, the pressure $p$ will rise until it resumes its former value necessary to counterbalance the compensator beam 17.

If on the other hand this resistant torque increases the working pressure $p$ will rise, thus shifting the slide valve 18 to the left. Cylinder 48 is connected to the exhaust through pipe lines 56, 31 and 47, and the inclination of impeller plate 12 and consequently the cubic capacity V2 of the receiver will decrease. As a consequence, the pressure $p$ drops until it resumes the value necessary to balance the beam 17.

As may be inferred from the foregoing whether the resistant torque increases or decreases, the pressure value is constantly brought back to a same, fixed value for a given engine speed during the operation of the device according to the phase illustrated in FIGURE 3.

Since the cubic capacity V1 of the generator is by hypothesis constant, it is clear that the input torque (proportional to the product $pV1$) is actually constant in this mode of operation corresponding to the regulation phase in which the pressure is constant and the cubic capacity of the receiver is variable.

If the resistant torque continues to increase, the inclination of plate 12 will gradually increase until it attains again its maximum value whereat the device resumes its intermediate condition as shown in FIGURE 2.

This intermediate condition may thus be attained, departed from and resumed by the transmission operating within, or from one to the other of, the two phases described hereinabove, these changes taking place in a perfectly reversible manner.

It is interesting to note that this reversibility feature is obtained, in the present invention, by using only conventional, simple hydraulic means, without resorting to mechanical coupling means such as linkages or the like, as contrasted with the arrangement described in the aforesaid prior patent of the applicant.

The clutch release member 54, shown in diagrammatic form only in FIGURES 1, 2 and 3 of the drawing, is of a known type clearly shown in FIGURE 4 wherein the high-pressure pipe line 7, the low-pressure pipe line 8 and the pipe line 55 communicating with the member 21 are reproduced and designated by the same reference numerals.

This member 54 comprises a cylindrical casing 58 mounted on a base 65 and having a piston 59 slidably mounted therein. This piston (as a consequence of the pressure fluid fed through the line 55 and prevailing in chamber 60) engages a slide valve 61 mounted in a bore 62 connected to the pipe line 7. Another duct 63 connected to the pump by means of the pipe line 8 leads into a chamber 64 through which extends said bore 62.

As long as the pressure in chamber 60 remains below a predetermined value subordinate to the engine speed the slide valve 61 is urged upwards, towards the chamber 60, thus interconnecting the ducts 7 and 8 through the uncovered passage comprising the duct 52, chamber 64 and duct 63. Under these conditions the transmission is disconnected from the final drive.

However, when the engine speed exceeds the critical or limit value the slide valve 61 moves downwards in its bore, thus isolating the ducts 62 and 63 from each other and causing the transmission to become operative.

When the engine speed drops below the critical threshold, the transmission is likewise automatically disconnected.

The member 21 shown in diagrammatic form in FIGURES 1, 2 and 3 is a tachometric pressure regulator-expander of which a more detailed construction is exemplified in FIGURE 5, the pipe lines 27 and 14 designating respectively, as in FIGURES 1 to 3, the regulated pressure and the pump pressure.

This member 21 comprises a cylindrical body 66 locked in a casing 67 and formed with a bore slidably engaged by a pressure-expanding slide valve 68 mounted according to the well known arrangement between the delivery side of the pump (to which said casing is connected by a pipe line 69) and the exhaust line 70, the expanded pressure being delivered through pipe line 70 and returning through another line 71 into the end chamber 72 for urging the slide valve 68 against an opposite force.

This opposite force is also obtained in a known manner by means of the centrifugal force of inertia weights 73 driven at the engine speed (or at a velocity proportional thereto) through a shaft 74. According to an advantageous form of embodiment, this shaft 74 has formed therein an axial bore slidably engaged by the shank of a conical pivot 75. During the rotation of shaft 74 the inertia weights 73 are urged outwards by the centrifugal force, thus lifting the pivot 75 (as shown in the figures), this pivot engaging the balls 76 of a ball race secured to the lower end of slide valve 68.

If the member 21 were utilized only in the manner just described hereinabove, it is clear that an expanded pressure obtained at 27 would be substantially proportional to the square of the velocity of rotation of shaft 74.

Now it is advantageous to modify this curve with a view to adapt it to a convenient "torque/speed" characteristic of the engine.

To this end, a sleeve 77 is slidably mounted on the lower extension of slide valve 68 and bears on the ball race 76 through the medium of a coil spring 78. A linkage 79, 80 fulcrumed on a pin 83 transmits to this sleeve 77 the deflection movements resulting from the depression of the accelerator pedal 82, by means of a cam 81 associated with this pedal.

The resulting characteristic curve will be traced with due regard for the fact that the pressure delivered by the member 21 is proportional to the input torque C1 (as already pointed out hereinabove) and may be plotted on the same scale as this torque in an engine "torque/speed" diagram.

Thus, curve 1 of FIGURE 12 is obtained, wherein the abscissa N1 designate the engine speed values.

The portion of this curve which extends on the left-hand side of point A relates to a first phase of the operation of said member 21 during which the spring 78 is still inoperative and the pressure varies as the square of the engine speed. From this point A to the right, the curve is abruptly deflected towards the x-axis.

Curve 2 relates to the maximum torque likely to be obtained from the engine for each speed concerned. B is the point corresponding to the maximum power output attainable by the engine and transmission system.

The curve 1 (which is the curve demanded of the engine for regulating the transmission) will thus correspond to power outputs slightly inferior to the maximum power outputs delivered by the engine at its different rotational velocities. This curve may be selected to be very close to the curve corresponding to the maximum engine output.

Another form of embodiment of the member 21 which is illustrated in FIGURES 6, 7 and 8 differs from the preceding one in that the ball race 176 is rigid with a rod 183 separate from the slide valve 168 but associated therewith by having this rod 183 slidably engaged in a bore formed in a race member 177 secured to the lower portion of slide valve 168.

The prestressed spring 178 urges these two members 168 and 183 away from each other up to a limit value set up by a circlip 184 mounted on the end of rod 183, the minimum value of the relative spacing of these members being determined by the engagement of an abutment consisting of the bottom of race 177.

FIGURE 6 shows this member during a first phase of the operation, at low speed, the thrust exerted by the inertia weights 173 being inferior to the force of the prestressed spring. The pressure exerted by the fluid delivered by the pressure-reducing device is then proportional to the square of the engine speed and, as shown in the diagram of FIGURE 13, corresponds to the portion of curve 1 which extends on the left-hand side of point A.

When the force exerted by the inertia weights is capable of overcoming the prestress of spring 178, the circlip 184 moves away from its lower bearing and spring 178 is compressed, thus providing the phase of operation illustrated in FIGURE 7 which corresponds to the section AB of curve 1 in the diagram of FIGURE 13.

When the speed further increases at one moment the inertia weights will cause the rod 183 to abut against slide valve 168, as shown in FIGURE 8. From this moment on, the law governing the pressure variation is again that of the square of the engine speed and corresponds to the curve section extending on the right-hand side of point B in the diagram of FIGURE 13.

Of course, the point whereat the change from the second phase to the third phase of operation of the regulator takes place is selected to be coincident with the point B of maximum.

The point at which the member 54 is engaged may likewise be so selected as to be coincident with the aforesaid point A whereat the operation of the above-described regulator-expander changes from the first phase to the second phase, thus reducing the useful section of curve 1 to the portion thereof which lies between said points A and B.

According to a third form of embodiment, shown in FIGURES 9, 10 and 11, of the device adapted to generate pressure as a function of engine speed, the member 21 of FIGURES 1, 2 and 3 is reduced to the construction shown in FIGURE 9 in which the axial component of the centrifugal force acting upon the inertia weights 273 is integrally transmitted through the rod 268 to the slide valve of the pressure-reducing device. As a result, the thrust exerted by the slide valve 218 of cylinder 219 on the compensator beam 217 is proportional to the square of the engine speed. To compensate the two rapid increment of this thrust thus applied to the compensator beam an auxiliary device is provided (see FIGURES 10 and 11) for operatively inter-connecting the carburation control pedal 282 and the compensator beam 217.

This device comprises a bell-crank lever 285 fulcrumed about a fixed pin 286 and having one end pivoted at 287 to an extension of beam 217 and another end pivoted at 288 to a spring-loaded variable-length element 289 utilizing a compression spring. The arm 297 of lever 285 is in axial alignment with the beam 217. The opposite end of element 289 is pivoted by means of a pin 290 to one end of a link 291 having its other end pivoted at 292 to an arm 293 with the accelerator pedal 282.

The pivot pin 290 is held at a constant spacing relative to a fixed pin 295 by means of a small connecting rod 294. Due to the moderate amplitude of the movements performed by the beam 217 and therefore of the bell-crank lever 285, the positions of pin 288 constantly remain very close to a fixed mean position. The position of the fixed pin 295 is so selected as to align same with said mean position.

Moreover, a spring 296 constantly pulls the pivot pin 287 in a direction at right angles to the arm 297 and exerts on the lever 285 a torque in a direction opposite to that of the torque resulting from the expansion of spring 289.

Under these conditions, when the pedal is released as shown in chain-dotted lines at $282^1$, the rod 291 is moved to $291^1$ and spring 289 to $289^1$, this spring urging the pivot pin 288 in a direction at right angles to the arm 298 of lever 285. In this position the expansion force of this spring provides a maximum torque which may be calculated with a view to balance at least partially the tension of spring 296.

When the pedal is depressed, the spring 289 assumes the oblique position shown in thick lines in FIGURE 10. Since its length has not been changed (due to the presence of the connecting rod 294), its expanding force remains unaltered but due to its inclination the resulting torque is strongly reduced. Since the opposite torque produced by the spring 296 remains unchanged this spring becomes preponderant so that the effort exerted by the lever 285 on pivot pin 287 of beam 217 will partially compensate the thrust produced by cylinder 219. This balanced thrust is illustrated under the same conditions as before by the curve 1 of FIGURE 14. It will be seen that this curve 1 still passes through points A and B, but does not display sharp changes in direction at A or B. Moreover, this device is advantageous in that it is substantially free of reactions on the pedal since the latter, when depressed, causes the spring 289, of which the length is set by the rod 294, to pivot about the substantially stationary pivot pin 288.

The various component elements of the kinematic arrangement thus provided between the pedal and the beam may be determined with a view to obtain any desired shape of said curve 1. Moreover, it may be noted that in this last form of embodiment if the accelerator pedal controlling the engine carburation is suddenly depressed this will produce on the beam an advanced correction of the thrust exerted by the first cylinder of which the consequence is to increase the reduction ratio of the transmission during the transitory time period in order to bring this ratio to a value higher than that to be subsequently obtained through the regulation means at the new engine speed to be attained.

Thus, during the transitory time period elapsing between the previous engine speed and the new engine speed, a cleaner engine acceleration is obtained, this constituting an advantageous feature inasmuch as this transitory time period is hereby reduced.

The same result is obtained, of course, by using the tachometric regulator shown in FIGURES 5 and 12, but the same does not apply to the device of FIGURES 6, 7, 8 and 13, for in this last case a gradual correction due to the spring 178 is brought in the thrust exerted by the first cylinder in lieu of the advanced correction as explained hereinabove.

If it is desired to obtain the same quick responsiveness of the accelerator pedal by using this last-named type of tachometric regulator, a device capable of retarding the changes in transmission ratios must be associated with this regulator. A device of this character may be obtained, as shown in FIGURE 15, by providing an auxiliary connection between the accelerator pedal and the beam.

In this FIGURE 15 the reference numeral 383 designates a pump adapted to draw hydraulic fluid by means of its piston 384 from a reservoir 385 through a non-return valve 386 this piston being urged by a return spring 387. It is clair that by depressing the accelerator pedal fulcrumed at 388 the piston 394 will force the fluid into a cylinder 389 of which the piston acts as a counter-abutment to the end of beam 317 disposed between this piston and the slide valve 318 of distributor cylinder 319. This counter-abutment may be obtained with a minimum stress by providing a compression spring 391 having the same function as the spring 23 of FIGURES 1, 2 and 3. The cylinder 389 also communicates with the reservoir 385 through a gaged throttle 390.

This device operates as follows: if the accelerator pedal is slowly depressed no hydraulic thrust is produced by the cylinder 389 for the fluid received by this cylinder has the possibility of flowing through the throttled passage 390, whereby the transmission and its regulating means operate according to the cycle described hereinabove, a new, higher input torque being demanded as a consequence of the stronger thrust exerted by the slide valve 318; thus, the transmission reduction ratio is adjusted according to the new engine speed obtained. On the other hand, if the pedal is suddenly depressed, the liquid delivered into the cylinder 389 has no sufficient time to escape through the throttled passage 390 and therefore the piston therein will exert a counterthrust opposite to the increased force applied by the slide valve 318 during the time period necessary to enable the fluid accumulated in the cylinder 389 to escape therefrom; under these conditions, during this time period the reduction ratio is increased to permit a more rapid engine acceleration.

I claim:

1. A device for automatically ensuring, for a given power output, the constancy of the input torque of a hydraulic transmission comprising a generator and a receiver both of the rotary-barrel type, applicable notably to automotive vehicles, which incorporates a compensator beam, a first cylinder exerting on said beam a thrust of a value subordinate to the engine speed, a second cylinder exerting on said beam a thrust proportional to the high pressure of said transmission, a movable abutment connected to an impeller plate and exerting on said beam a reaction balancing the aforesaid two thrusts, a third cylinder for increasing the cubic capacity of said generator in opposition to a fourth return cylinder having a smaller cross-sectional area, a fifth cylinder for decreasing the cubic capacity of said receiver in opposition to a sixth return cylinder of smaller cross-sectional area, said fourth and sixth cylinders being permanently fed from the low-pressure side of the transmission, a first distributor controlled by said first cylinder and fed from said low-pressure side, the outlet of said distributor being either connected to said low-pressure side, or cut off, or connected to the exhaust according as to whether the moment due to said first cylinder is higher, equal or inferior to that of said second cylinder, a second slide-valve distributor controlled by purely hydraulic means as a function of the positions of the four last-named cylinders and adapted to connect the outlet of said first distributor either to said third cylinder alone, or to said third and fifth cylinders, or to said fifth cylinder alone, according to three separate phases of the transmission operation determined respectively in that the variations in cubic capacity apply to the generator alone with the receiver locked in its maximum cubic capacity position, and to the generator and receiver when both are very close to their maximum cubic capacity, whereby the whole of said phases will cover continuously and reversibly the complete range of the desired reduction ratios.

2. A device according to claim 1, wherein said third and sixth cylinders each receive two pipe lines of which the first one leads into the bottom of the cylinder and the other into a groove formed in said cylinder which co-acts with channels and ducts of the piston therein whereby said groove communicates with the interior of said cylinder when the piston is in its remotest position from the bottom of said cylinder and with the atmosphere in all the other positions thereof, said first pipe lines of said third and sixth cylinders being connected to the second distributor so as to be controlled by the slide valve thereof, said slide valve projecting into two end chambers of which the first one is connected to the groove of said third cylinder and the second one to the groove of said fourth cylinder, said slide valve being urged by spring means to an intermediate position whereby, under the influence of said springs and of the pressures prevailing in said end chambers, said slide valve may assume three stable positions of which the first one is shifted towards said first chamber, the second one is the aforesaid intermediate position, and the third one is shifted towards said second chamber, said positions corresponding respectively to the three separate modes of operation of the transmission adjustment which are cited in claim 1.

3. A device according to claim 1, wherein the thrust produced by said first cylinder is due to the pressure of the liquid delivered by a centrifugal, engine-driven regulator-expander, operating according to a principle known per se, but wherein the action of inertia weights is controlled through the medium of an elastic member in order to provide a pressure curve as a function of speed which corresponds to an advantageous "torque/speed" characteristic of the engine.

4. A device according to claim 3, wherein said elastic member for controlling the centrifugal regulator-expander is associated with a pedal controlling the carburetion in such a manner that said member will be overcompressed as a function of the depression of said pedal, said overcompression being transmitted by means of a cam of adequate contour which is operative in the useful speed range.

5. A device according to claim 3 wherein said elastic member controlling the centrifugal regulator-expander is a prestressed spring of which the elastic compressive action is effective only in the useful speed range.

6. A device according to claim 3, wherein the elastic member controlling the regulator-expander consists of a bell-crank lever fulcrumed about a fixed pivot pin extending through its elbow, a first arm of said lever having its end connected to an extension of said compensator beam by means of a pivot pin pulled by a first spring with a force and in a direction that is substantially constant and adapted to counteract the thrust of said first cylinder, the other end of said lever benig connected to the carburetion control pedal through another spring of the expansion type urging said beam in the direction of said first cylinder and having an end pivoted by means of a pin to the end of the second arm of said bell crank lever and its other end pivoted by means of another pivot pin to a connecting rod operatively connected to the pedal and to a link pivoting about a fixed pin substantially aligned with the pivot pin of the first pivotal connection of said second spring, this arrangement operating in such a manner that when said carburetion control pedal is depressed a pivotal movement takes place without producing any variation in the length of said second spring, whereby the torque applied by said second spring to said bell crank lever decreases considerably and the constant torque due to said first spring becomes preponderant and counteracts the thrust of said first cylinder as a function of the degree of depression of said pedal, the lack of elongation of said second spring being characterized by the absence of reaction on said pedal.

7. A device according to claim 1, wherein, in order to permit a greater acceleration of the engine in case of sudden depression of the carburetion control pedal, a retarding device may be added which comprises a pump actuated by said pedal the depression of which causes hydraulic fluid to be delivered into a fifth cylinder opposite to said first cylinder and connected to the discharge reservoir by means of a gaged throttle.

References Cited by the Examiner

UNITED STATES PATENTS

| | | | |
|---|---|---|---|
| 2,972,224 | 2/1961 | Forster | 60—19 |
| 3,166,891 | 1/1956 | Weisenbach | 60—19 |
| 3,247,669 | 4/1966 | Hann | 60—19 X |

EDGAR W. GEOGHEGAN, *Primary Examiner.*